US009296317B2

(12) United States Patent
Meister et al.

(10) Patent No.: US 9,296,317 B2
(45) Date of Patent: *Mar. 29, 2016

(54) LEG RESTRAINT DEVICE FOR SIDE-FACING SEATED VEHICLE OCCUPANTS

(71) Applicant: B/E Aerospace, Inc., Wellington, FL (US)

(72) Inventors: Pete C. Meister, Miami, FL (US); Michael J. Farvet, Wellington, FL (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/627,168

(22) Filed: Feb. 20, 2015

(65) Prior Publication Data
US 2015/0158592 A1 Jun. 11, 2015

Related U.S. Application Data

(63) Continuation of application No. 14/519,996, filed on Oct. 21, 2014, now Pat. No. 9,139,114, which is a continuation of application No. 14/060,143, filed on Oct. 22, 2013, now Pat. No. 8,894,095, which is a continuation-in-part of application No. 13/907,079, filed on May 31, 2013, now Pat. No. 8,955,914.

(51) Int. Cl.
B60N 2/427 (2006.01)
B64D 25/00 (2006.01)
B60R 21/231 (2011.01)
B64D 11/06 (2006.01)
B60R 21/02 (2006.01)
B60R 21/20 (2011.01)
B60R 21/0132 (2006.01)
B60R 21/04 (2006.01)
B60R 21/00 (2006.01)
B60R 21/16 (2006.01)
B60R 21/01 (2006.01)

(52) U.S. Cl.
CPC ........ *B60N 2/42727* (2013.01); *B60R 21/0132* (2013.01); *B60R 21/02* (2013.01); *B60R 21/0428* (2013.01); *B60R 21/20* (2013.01); *B60R 21/23138* (2013.01); *B64D 11/06* (2013.01); *B64D 11/0619* (2014.12); *B64D 11/0621* (2014.12); *B64D 11/06205* (2014.12); *B64D 25/00* (2013.01); *B60R 2021/0053* (2013.01); *B60R 2021/0093* (2013.01); *B60R 2021/01231* (2013.01); *B60R 2021/0273* (2013.01); *B60R 2021/161* (2013.01); *B60R 2021/23146* (2013.01); *B60R 2021/23176* (2013.01)

(58) Field of Classification Search
CPC ........... B60N 2/4221; B60R 2021/022; B60R 21/23138; B60R 21/23148
See application file for complete search history.

(56) References Cited

U.S. PATENT DOCUMENTS 4,198,075 A * 4/1980 Kob .................. B60R 21/02 280/728.3
2010/0019477 A1* 1/2010 Korechika .............. B60R 21/02 280/748

*Primary Examiner* — Ruth Ilan
*Assistant Examiner* — Darlene P Condra
(74) *Attorney, Agent, or Firm* — Shumaker, Loop & Kendrick, LLC

(57) ABSTRACT

A lower leg restraint for a side-facing passenger seat including a panel configured to deploy from a first position proximate a seat to a second position forward of the seat in response to an abrupt deceleration event, an actuator coupled with the panel for driving panel deployment from the first position to the second position, and a sensor communicatively coupled with the actuator, the sensor configured to sense the abrupt deceleration event and trigger actuator movement in response thereto. A side-facing aircraft passenger seat having an automatically deployable lower leg restraint.

14 Claims, 7 Drawing Sheets

LEG RESTRAINT DEVICE FOR SIDE-FACING SEATED VEHICLE OCCUPANTS

CROSS-REFERENCE TO RELATED PATENT APPLICATIONS

This continuation application claims priority from U.S. patent application Ser. No. 14/519,996 filed Oct. 21, 2014, which is a continuation application claiming priority from U.S. patent application Ser. No. 14/060,143, filed Oct. 22, 2013, which is a continuation-in-part application claiming priority from U.S. patent application Ser. No. 13/907,079, filed May 31, 2013, the entirety of each of which is incorporated by reference herein.

TECHNICAL FIELD AND BACKGROUND OF THE INVENTION

The present invention relates to a leg restraint device for side-seated vehicle occupants. In particular, the invention relates to a leg restraint device for a side-seated occupant of, for example, corporate aircraft of the type offering side-facing seats for passengers. The disclosed invention has application in any form of vehicle transportation where passenger or occupant seats may be mounted in a side-facing orientation in relation to the direction of forward travel of the vehicle, such as an aircraft. The FAA has released Policy PS-ANM-25-03-R1 requiring leg flail prevention for occupants seated in side-facing seats when the occupant's upper leg is restricted by contact with the seat itself and/or with an interior component. In order to provide adequate occupant protection, the lower legs must also be restricted in a similar manner to avoid upper leg femur bone torsion. Thus, there is a need for a device that will provide this lower leg support during a dynamic event such as a crash.

Violent or abrupt deceleration can cause high g-force lateral loading on a side-facing passenger, causing lateral leg movement and leg rotation about the knee and femur. This can cause dislocations, muscle and tendon injuries and fractures due to the restraint exerted on the passengers' torso by seat belts and/or arm rests while the legs are unrestrained. However, belts or similar restraints on the legs are not advisable due to the additional time needed to remove the restraints, as well as the possibility that injuries to the passenger may make it difficult for either the passenger or emergency personnel to remove such restraints.

Therefore, there is a need for a type of leg restraint that provides protection to the legs of side-facing seat occupants in the event of a crash or other rapid deceleration, while not inhibiting rapid egress from the seat after the event.

The leg flail prevention device disclosed in this application deploys automatically and may be designed to be triggered by a sensor and trigger used to deploy inflatable shoulder harness air bags also installed on the side-facing seat. As such, for installations that restrict the side-facing occupant's upper legs in the forward direction, the automatic leg flail prevention device is utilized to introduce the higher level of occupant protection. In an embodiment disclosed in the application, a linear restraint panel presents the main restriction to the occupant's lower legs to prevent leg flail. This restraint panel may be deployed by the inflation force of an attached air bag. Once the air bag deploys the restraint panel, the portion of the air bag attached to the restraint panel further inflates between the restraint panel and the leg to cushion the impact of the occupant's legs with the restraint panel.

SUMMARY OF THE INVENTION

It is therefore an object of the present invention to provide a leg restraint that provides protection to the legs of side-facing seat occupants in the event of a crash or other rapid deceleration.

It is another object of the invention to provide a leg restraint device that provides protection to the legs of side-facing seat occupants in the event of a crash or other rapid deceleration, while not inhibiting rapid egress from the seat after the event.

It is another object of the invention to provide a leg restraint device that provides protection to the lower legs of side-facing seat occupants in the event of a crash or other rapid deceleration, but that need not be deployed during taxi, take-off and landing ("TTOL").

It is another object of the invention to provide a leg restraint that includes an actuator, such as an air bag, hood popper, etc., as a means of deploying a linear restraint panel that acts to restrict lateral movement of the lower legs of a side-seated occupant.

It is another object of the invention to provide a leg restraint that includes a cushion, foam or deployable air bag as a means of cushioning and restricting lateral movement of the lower legs of a side-facing seat occupant.

It is another object of the invention to provide a leg restraint that includes an actuator configured to deploy outwardly from the seat a linear restraint panel that acts to restrict lateral movement of the lower leg, whereupon the linear restraint cushions and restricts lateral movement of the lower legs of a side-facing seat occupant.

These and other objects and advantages of the invention are achieved by providing a leg restraint for side-seated vehicle occupants, and including a leg-restraining member adapted for being mounted in proximity to a side-facing vehicle seat and selectively moveable between a deployed, outwardly-extending leg-protecting position and a retracted, non-leg interfering position, and an actuator positioned operatively proximate the leg-restraining member and responsive to a signal output by a sensor for deploying the leg-restraining member upon the occurrence of an abrupt deceleration of the vehicle sensed by the sensor. The leg-restraining member may be in the form of a mechanical panel assembly, which may or may not be cushioned.

In another embodiment, a lower leg restraint for a side-facing passenger seat is provided herein including a panel configured to deploy from a first position proximate a seat to a second position forward of the seat in response to an abrupt deceleration event, an actuator coupled with the panel for driving panel deployment from the first position to the second position, and a sensor communicatively coupled with the actuator, the sensor configured to sense the abrupt deceleration event and trigger actuator movement in response thereto.

According to another embodiment, the panel may deploy from within a housing adapted to be positioned under the seat.

According to another embodiment, the panel may deploy linearly along a floor supporting the seat.

According to another embodiment, a major face of the panel may carry a cushion for cushioning against direct impact with the panel.

According to another embodiment, the actuator may be one of an air bag, a linear actuator, and a gas charged rod.

According to another embodiment, the lower leg restraint may further include a biasing member arranged to bias the panel toward the first position, the actuator adapted to overcome a biasing force of the biasing member to deploy the panel in response to the abrupt deceleration event.

According to another embodiment, the panel may be an elongate member having a vertical dimension spanning a distance between a floor supporting the seat and a seat pan of the seat.

According to another embodiment, the actuator may be a two-stage air bag in which a first stage deploys the panel to the second position and a second stage inflates the air bag in a direction away from a face of the panel.

According to another embodiment, the lower leg restraint may include a slide mounted in a housing for movement on at least one stationary guide shuttle mounted on an inner surface of the housing.

In another embodiment, provided herein is a side-facing aircraft passenger seat having a deployable lower leg restraint including a seat bottom, a seat back, a panel configured to deploy from a first position proximate the seat bottom to a second position forward of the seat bottom in response to an abrupt deceleration event, an actuator coupled with the panel for driving panel deployment from the first position to the second position, and a sensor communicatively coupled with the actuator, the sensor configured to sense the abrupt deceleration event and trigger actuator movement in response thereto.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
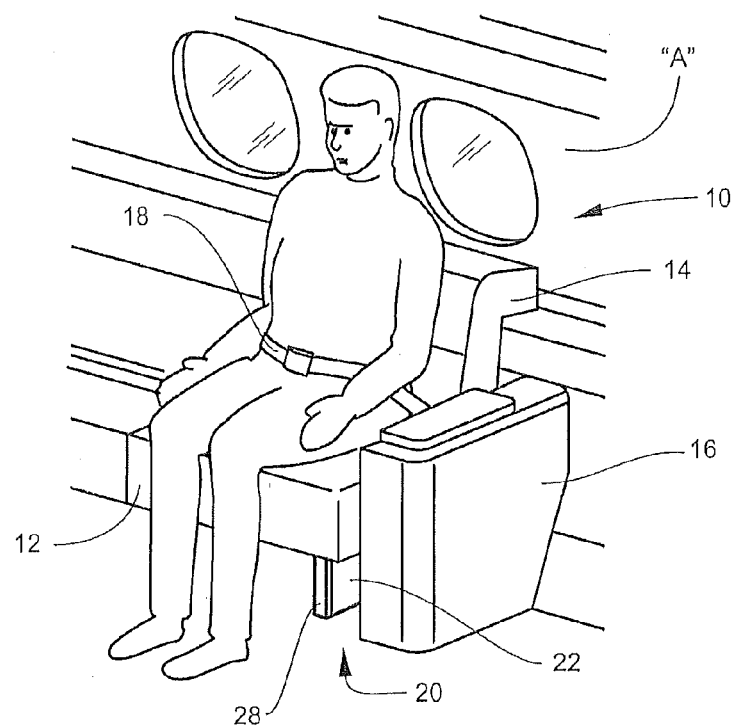
FIG. 1 is a perspective view of a side-seated aircraft seat, showing a leg restraint device according to a preferred embodiment of the invention in its retracted position.

Referring now specifically to the drawings, the environment of the disclosure is an aircraft of the type having side-facing seats, such as seat 10, having a seat bottom 12, seat back 14 and an armrest/end bay 16. Accordingly, a seat occupant sits with his or her back to the aircraft fuselage "A", facing outward in a generally perpendicular direction in relation to the longitudinal dimension of the aircraft and its direction of forward travel. For this reason, the occupant is subject to substantial lateral g-force loading along the longitudinal axis of the aircraft in the event of an abrupt deceleration such as might result during hard braking or a forward-directed crash event. While the upper torso and the thigh area of the legs are restrained to some extent by the armrest 16 and the seat belt 18, the lower legs are free to be projected laterally forward, rotating violently around an axis defined by the knees, causing potential serious injury to both the knees and lower legs unless they are restrained in some manner. Injury to the legs is a particularly serious concern since such injuries could prevent a passenger from being able to egress unaided from the aircraft in the event of an accident.

Figure 2:
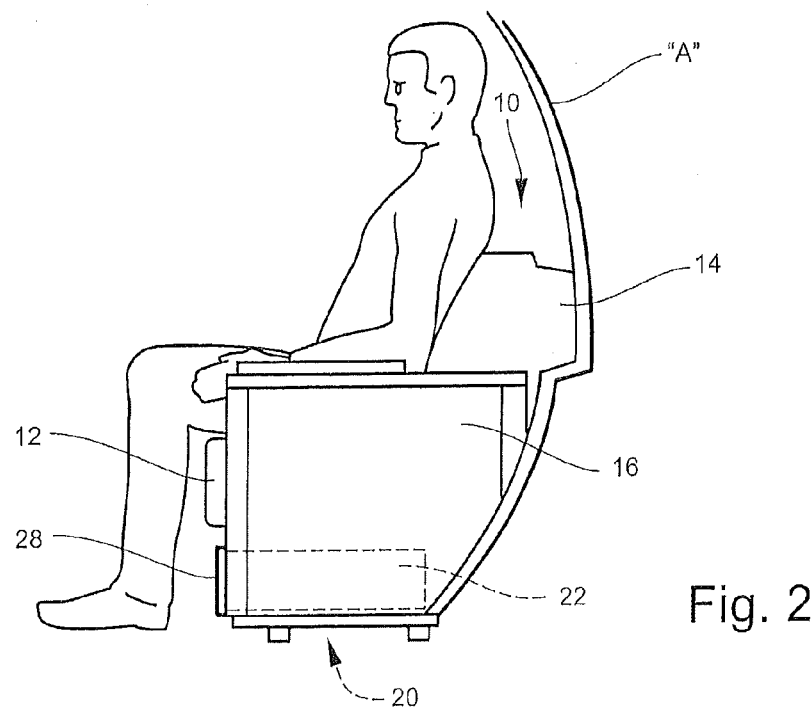
FIG. 2 is a side elevation of a side-seated aircraft seat, showing a leg restraint device according to a preferred embodiment of the invention in its retracted position.

Thus, in accordance with the invention, a leg restraint device 20 is provided. As shown in FIGS. 1 and 2, the leg restraint device 20 is mounted under the seat 10 forward of the occupant in relation to the aircraft's direction of forward travel. The leg restraint device 20 generally includes a housing 22 mounted under the seat 10, and a deployable restraint panel 24, which includes a cap plate 28 on the distal end. During boarding, deplaning and normal flight, the leg restraint device 20 remains in a retracted position, as shown in FIGS. 1 and 2. In the event of an emergency that may result in an abrupt deceleration, the restraint panel 24 is configured to automatically deploy, as described below in detail.

The leg restraint device 20 as shown in the Figures is a "left-hand" oriented device shown mounted under a seat 10 and a left-hand side of the aircraft fuselage "A", from the position of the seat occupant. A right-handed device constructed in accordance with the invention would be utilized on seats facing inward from the right-hand side of the aircraft fuselage "A." In general, the left and right-hand versions may be mirror constructions of each other. A seat 10 may include both left-hand and right-hand restraints to accommodate deceleration events in either direction.

Figure 3:
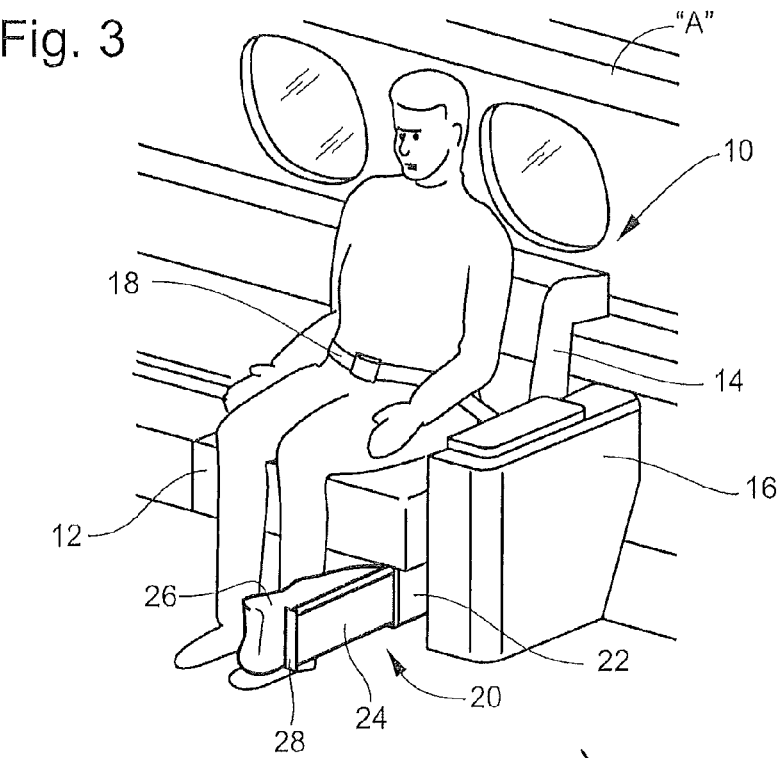
FIG. 3 is a perspective view of a side-seated aircraft seat, showing a leg restraint device according to a preferred embodiment of the invention in its deployed position.
Figure 4:
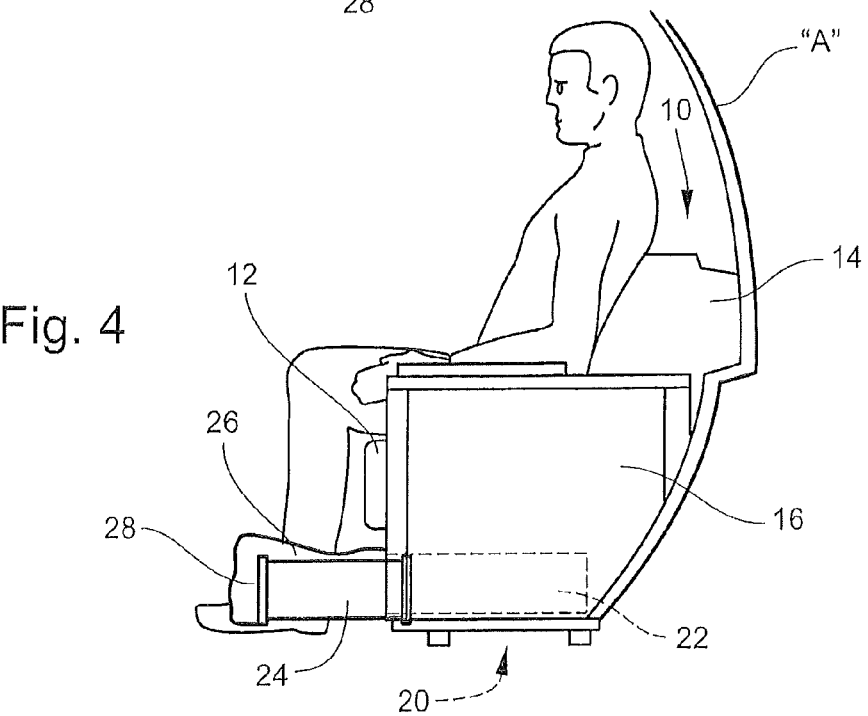
FIG. 4 is a side elevation of a side-seated seat, showing a leg restraint device according to a preferred embodiment of the invention in its deployed position.

As shown in FIGS. 3 and 4, the restraint panel 24 deploys to a position forward of the seat 10 immediately adjacent the forward lower leg of the passenger in relation to the traveling direction of the aircraft. In the deployed position, the panel 24 prevents lower leg flails, i.e., movement of the lower leg along the traveling direction of the vehicle. In the event of abrupt deceleration sufficient to trigger restraint panel deployment, the forward leg, and consequently the other leg through contact with the forward leg, is restrained by the panel 24 against forward movement. As described in further detail below, an actuator associated with the panel 24 functions to automatically deploy the panel 24 during a triggering event. Suitable actuators may include, but are not limited to, an air bag, pusher, piston, gas cylinder and rod, and like linear actuator for triggering instantaneous panel deployment. Upon the occurrence of an event requiring side restraint protection of the seat occupant, the actuator is triggered to force the restraint panel 24 rapidly from beneath the seat 10.

In the case of an air bag 26 serving as the actuator, in a first phase the airbag inflates to deploy the restraint panel 24 from beneath the seat 10 to the forward position. During a second inflation phase of the deployment of the air bag 26, the air bag 26 continues inflating and projects outwardly along the side of the deployed restraint panel 24 nearest the seat occupant's foot and lower leg, i.e., in a direction away from a face of the restraint panel 24. In this configuration, shown in FIGS. 3 and 4, the air bag 26 provides an air cushion for the seat occupant's foot and lower leg that prevents direct contact with the inner face of the restraint panel 24. Note that in its fully deployed configuration, the air bag 26 may extend beyond the fully deployed position of the cap plate 28 of the restraint panel 24 in order to fully protect the seat occupant's foot and lower leg.

The restraint panel 24 may be configured to automatically retract after the deceleration event is over. In the case of an air bag actuator, deflation of the air bag 26 may cause the restraint panel 24 to retract back into its respective housing 22. Retraction may occur rapidly to remove tripping hazards and clear the area around the seat 10 for rapid, unrestricted egress by both the seat occupant and other aircraft occupants who may have to move past the seat 10 in order to egress from the aircraft.

Figure 5:
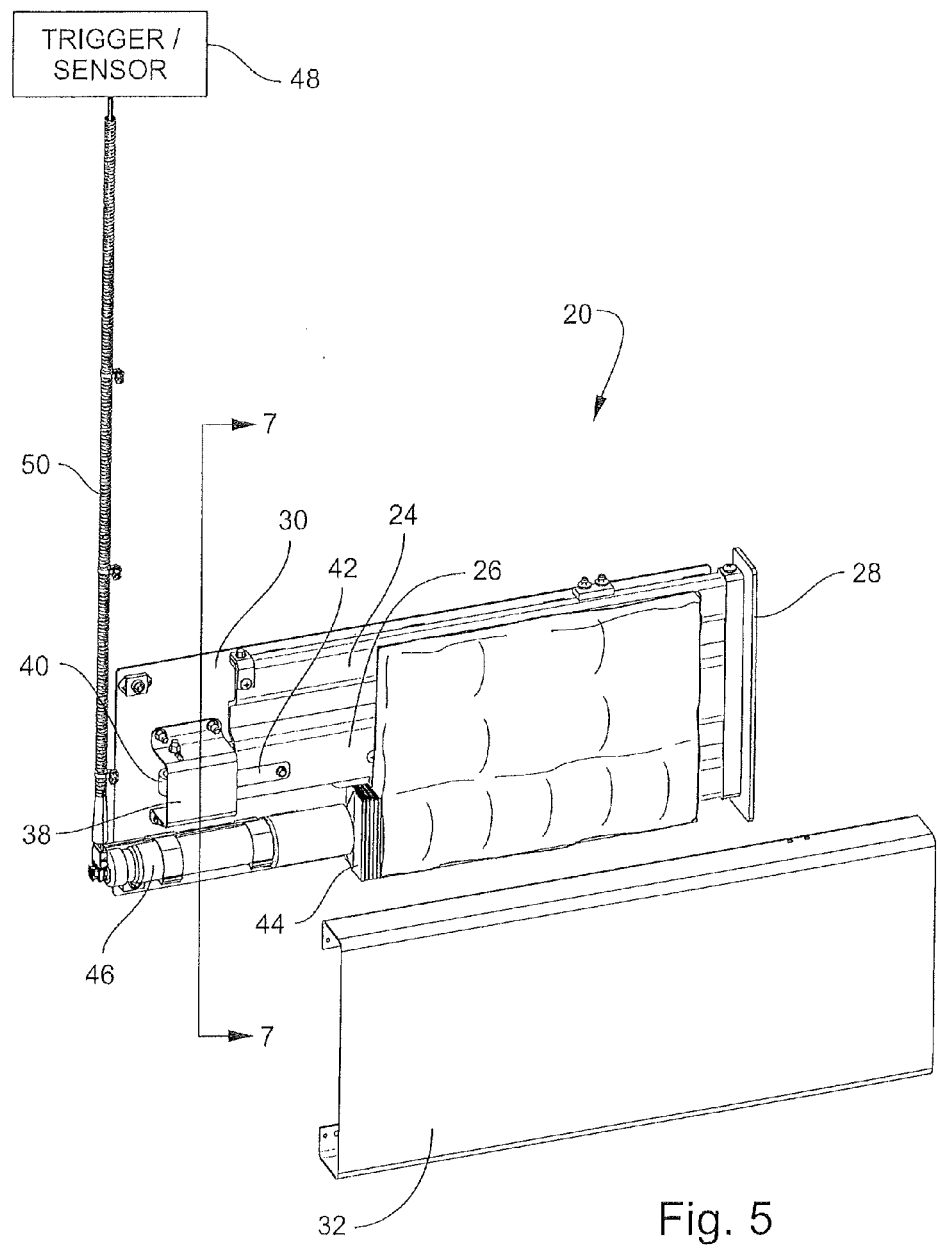
FIG. 5 is a partially-exploded view of one embodiment of the invention showing the air bag in its stowed, retracted position.
Figure 6:
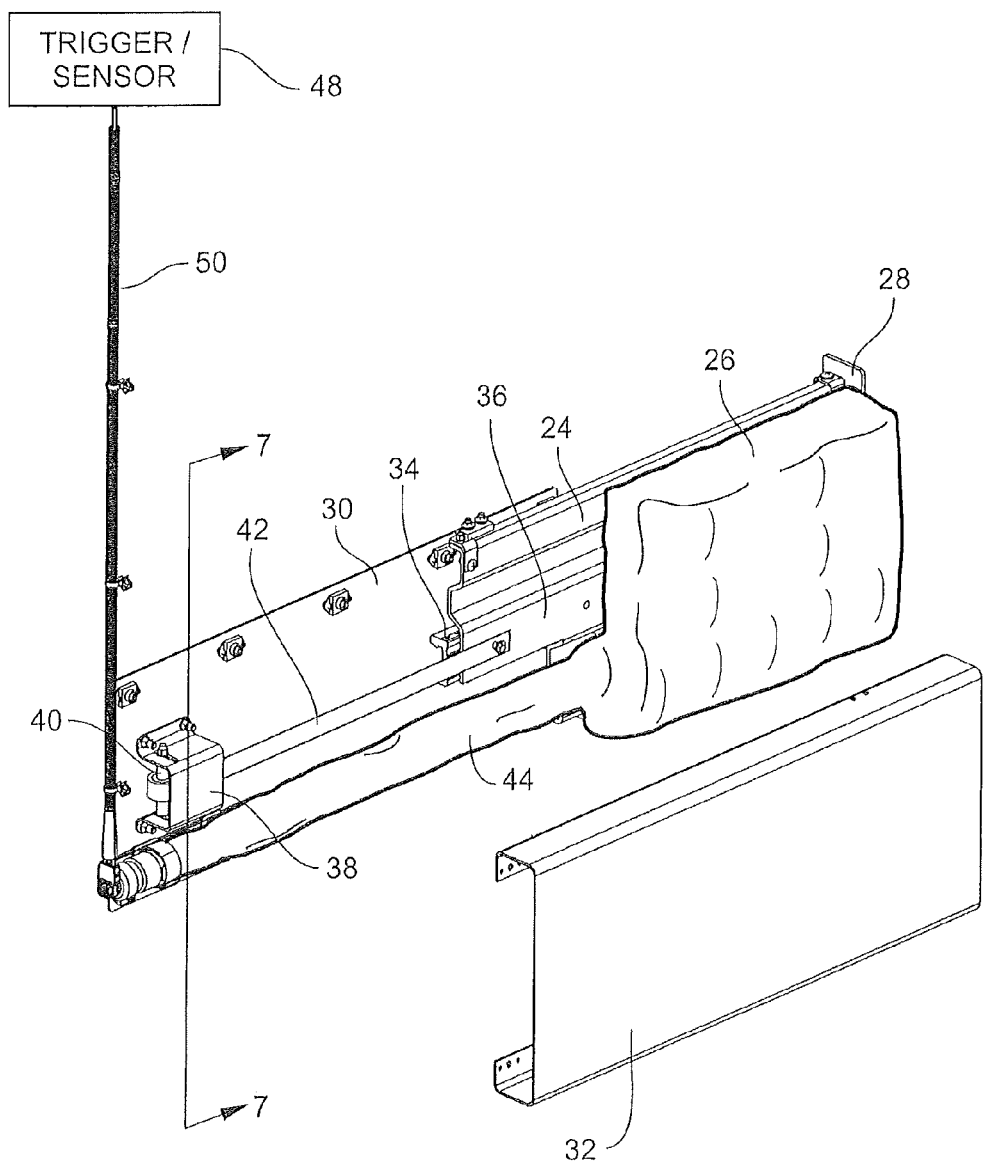
FIG. 6 is a partially-exploded view of one embodiment of the invention showing the air bag in its fully deployed position.
Figure 7:
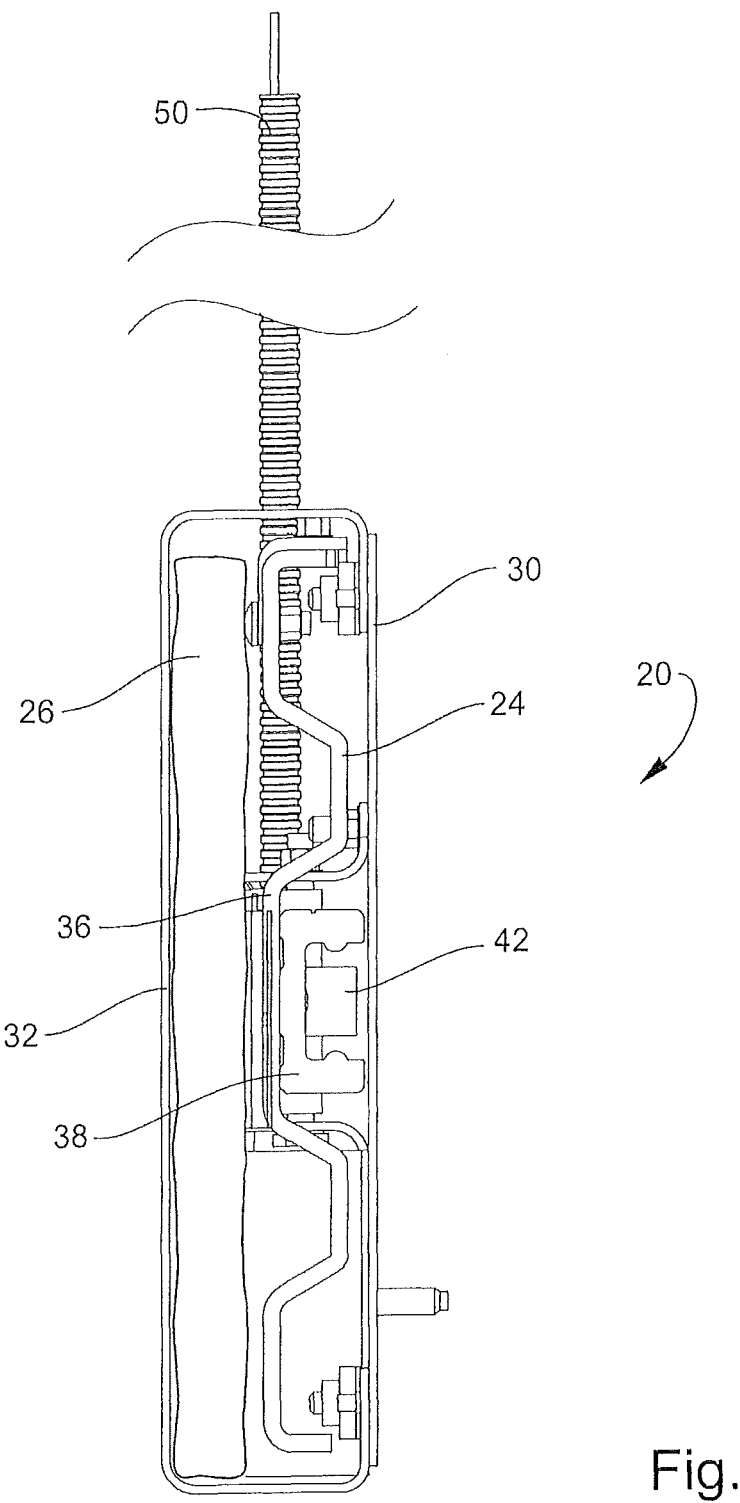
FIG. 7 is a vertical cross-section taken along line 7-7 of FIG. 5.
Figure 8:
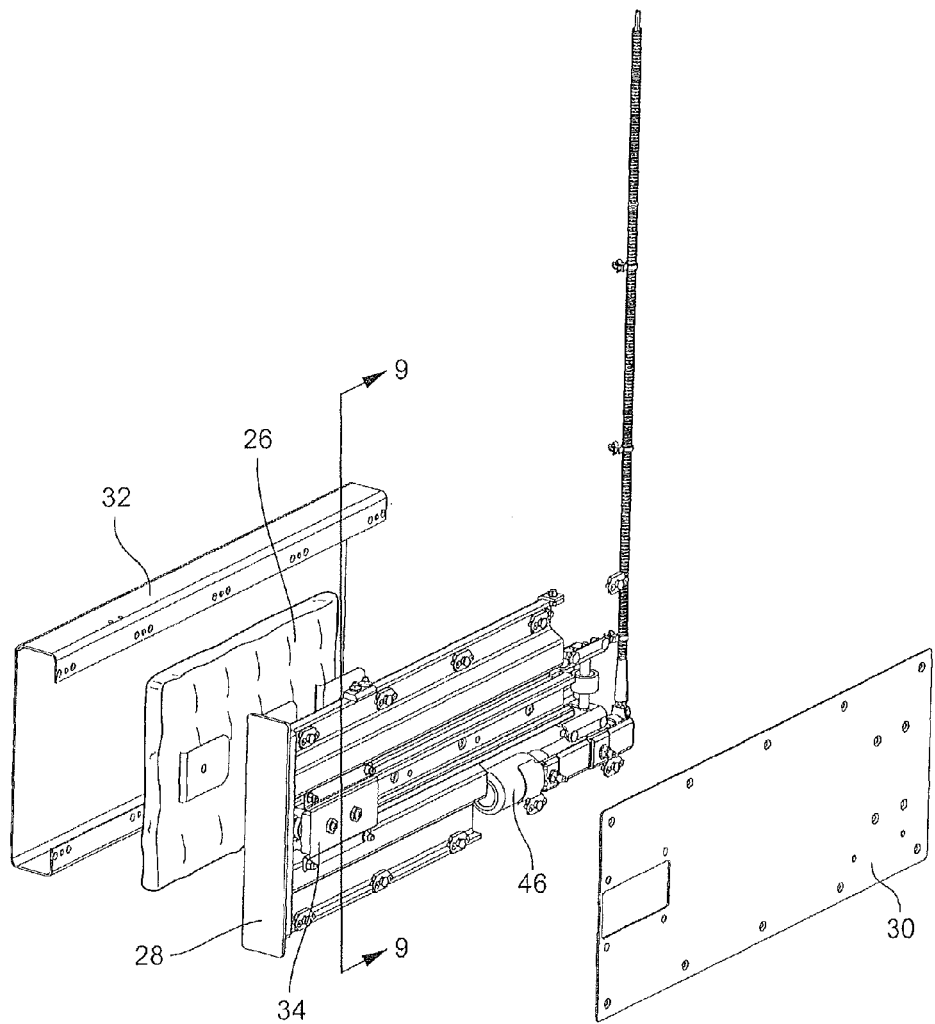
FIG. 8 is an exploded view of one embodiment of the invention from a side opposite FIGS. 5 and 6.
Figure 9:
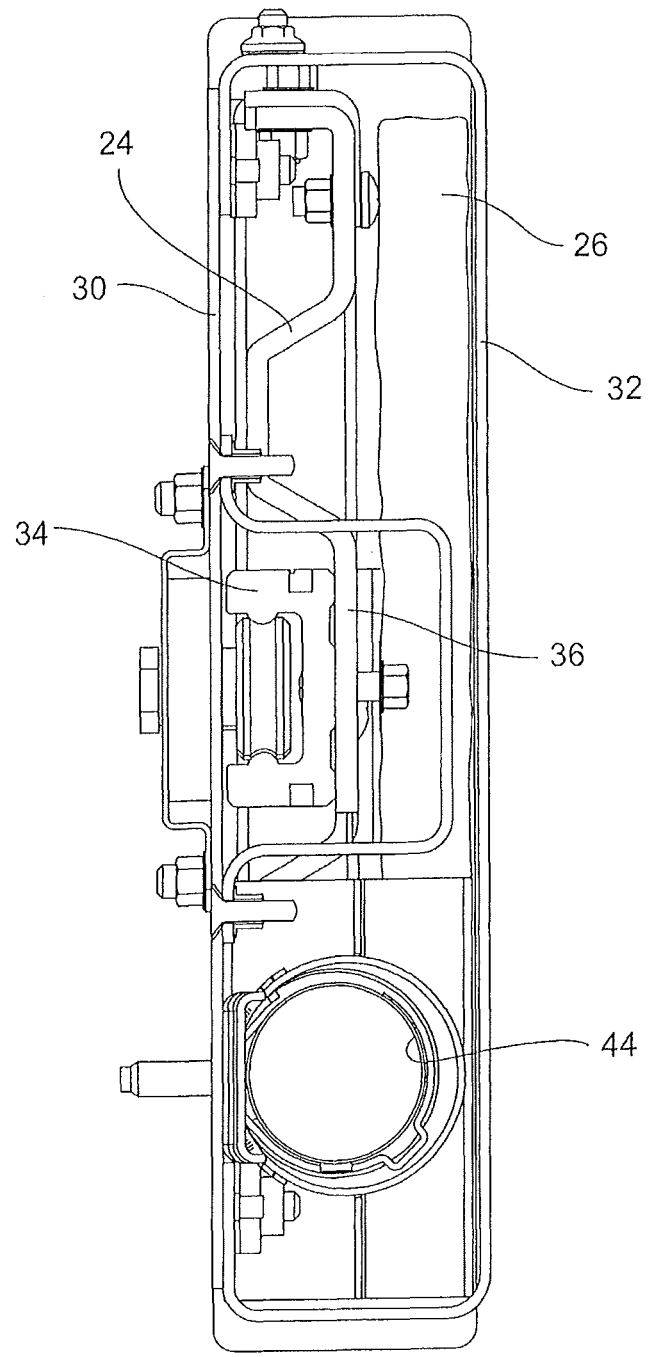
FIG. 9 is a vertical cross-section taken along line 9-9 of FIG. 8.

Referring now to FIGS. 4-9, the housing 22 of the restraint device 20 is formed from two stationary housing covers 30, 32. The restraint panel 24 and the cap plate 28 slide in and out of the retracted and deployed positions on a wheeled guide shuttle 34 mounted on the inner surface of housing cover 32. As shown in FIGS. 7 and 9, the restraint panel 24 has a "corrugated" cross-section to provide the necessary spacing for the movable components. The guide shuttle 34 is captured in and rides along a central, longitudinally-extending recess 36 in the restraint panel 24.

The restraint panel 24 is attached to a retractor that includes a spring housing 38 mounted on the cover 30. A vertical pin 40 mounts a coiled steel spring 42 that is mounted on the restraint panel 24 and biased towards its retracted position. See FIG. 5. Activation of the air bag 26 overcomes the bias of the spring 42 during inflation, allowing the restraint panel 24 to deploy, as shown in FIG. 6. As inflation ends and deflation begins, the spring 42 causes the restraint panel 24 to immediately retract so that, as described above, the restraint panel 24 does not project into the aircraft aisle impeding egress from the aircraft.

The air bag 26 is mounted on and extends along the length of the restraint panel 24. As is shown in FIG. 5, the air bag 26, before deployment, resides in a deflated configuration against the restraint panel 24. The air bag 26 includes a tubular neck 44 that is attached to an inflator 46 mounted on the cover 32. In the deflated configuration, the neck 44 is folded in an accordion manner between the inflator 46 and the air bag 26. The term "air bag" is generally used to describe this device even though gases other than "air" cause the bag to inflate. The inflator 46 may be a cold gas inflator, a hybrid inflator, or a pyrotechnic inflator depending on the design factors of the device. Speed, deployment time, gas temperature, etc. can all dictate the type of inflator 46 utilized to achieve the desired operation and may be the subject of varying legal and technical requirements.

The inflator 46 may be triggered by a trigger/sensor 48 that is also used to activate the seat belt 18, see FIG. 6, or by a trigger/sensor that functions only to inflate the air bag 26. As shown in FIGS. 5 and 6, the trigger/sensor 48 communicates with the inflator 46 through a shielded conduit 50. As shown in FIG. 6, inflation of the air bag 26 causes the neck 44 to first inflate as gas passes from the inflator 46 to the air bag 26. This inflation causes the neck 44 to unfold and straighten, driving the air bag 28 and the restraint panel 24 on which it is mounted rapidly forward out of the housing 22 and into the aisle of the aircraft, as shown in FIGS. 3 and 4. Typically, the air bag 26 is fully inflated within approximately 60-80 milliseconds, and vents in the air bag 26 allow the gas to escape, very rapidly deflating the air bag 26. The spring 42 rapidly returns the restraint panel 24 and air bag 26 to the position shown in FIG. 5, as described above.

A leg restraint device for side-seated vehicle occupants according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A lower leg restraint for a side-facing passenger seat, comprising:
   (a) a panel deployable from within a dedicated housing adapted to be positioned beneath the seat, the panel mounted to a slide mounted in the housing for movement along at least one stationary guide shuttle mounted on an inner surface of the housing, the panel configured to deploy from a first position proximate the seat to a second position forward of the seat in response to an abrupt deceleration event;
   (b) an actuator coupled with the panel for driving panel deployment from the first position to the second position; and
   (c) a sensor communicatively coupled with the actuator, the sensor configured to sense the abrupt deceleration event and trigger actuator movement in response thereto.

2. The lower leg restraint of claim 1, wherein the panel deploys linearly along a floor supporting the seat.

3. The lower leg restraint of claim 1, wherein a major, face of the panel carries a cushion for cushioning against direct impact with the panel.

4. The lower leg restraint of claim 1, wherein the actuator is one of an air bag, a linear actuator, and a gas charged rod.

5. The lower leg restraint of claim 1, further comprising a biasing member arranged to bias the panel toward the first position, the actuator adapted to overcome a biasing force of the biasing member to deploy the panel in response to the abrupt deceleration event.

6. The lower leg restraint of claim 1, wherein the panel is an elongate member having a vertical dimension spanning a distance between a floor supporting the seat and a seat bottom of the seat.

7. The lower leg restraint of claim 1, wherein the actuator is a two-stage air bag in which a first stage deploys the panel to the second position and a second stage inflates the air bag in a direction away from a face of the panel.

8. A side-facing aircraft passenger seat having a deployable lower leg restraint, comprising:
   (a) a seat bottom;
   (b) a seat back
   (c) a panel deployable from within a dedicated housing adapted to be positioned beneath the seat bottom, the panel mounted to a slide mounted in the housing for movement along at least one stationary guide shuttle mounted on an inner surface of the housing, the panel configured to deploy from a first position proximate the seat bottom to a second position forward of the seat bottom in response to an abrupt deceleration event;

(d) an actuator coupled with the panel for driving panel deployment from the first position to the second position; and (e) a sensor communicatively coupled with the actuator, the sensor configured to sense the abrupt deceleration event and trigger actuator movement in response thereto.

9. The seat of claim 8, wherein the panel deploys linearly at a height just above a floor supporting the seat.

10. The seat of claim 8, wherein a major face of the panel carries a cushion for cushioning against direct impact with the panel.

11. The seat of claim 8, wherein the actuator is one of an air bag, a linear actuator, and a gas charged rod.

12. The seat of claim 8, further comprising a biasing member arranged to bias the panel toward the first position, the actuator adapted to overcome a biasing force of the biasing member to deploy the panel in response to the abrupt deceleration event.

13. The seat of claim 8, wherein the panel is an elongate member having a vertical dimension spanning a distance between a floor supporting the seat and the seat bottom.

14. The seat of claim 8, wherein the actuator is a two-stage air bag in which a first stage deploys the panel to the second position and a second stage inflates the air bag in a direction away from a face of the panel.

\* \* \* \* \*